(12) United States Patent
Hoshi et al.

(10) Patent No.: US 8,973,615 B2
(45) Date of Patent: Mar. 10, 2015

(54) FLUID CONTROL DEVICE

(75) Inventors: George Hoshi, Tsukui-gun (JP);
Tsuneyuki Okabe, Tsukui-gun (JP);
Kenichi Goshima, Komaki (JP); Hideo Kobayashi, Komaki (JP); Akinori Nagaya, Komaki (JP); Michio Yamaji, Osaka (JP); Kazuhiro Yoshikawa, Osaka (JP); Yuji Kawano, Osaka (JP)

(73) Assignees: Tokyo Electron Limited, Tokyo (JP); CKD Corporation, Aichi (JP); Fujikin Incorporated, Osaka (JP)

( * ) Notice: Subject to any disclaimer, the term of this patent is extended or adjusted under 35 U.S.C. 154(b) by 1200 days.

(21) Appl. No.: 09/893,522

(22) Filed: Jun. 29, 2001

(65) Prior Publication Data
US 2002/0031417 A1    Mar. 14, 2002

(30) Foreign Application Priority Data

Jun. 30, 2000 (JP) ................... 2000-200012
Nov. 10, 2000 (JP) ................... 2000-343709

(51) Int. Cl.
*F16K 27/00* (2006.01)

(52) U.S. Cl.
CPC ................ *F16K 27/003* (2013.01)
USPC ......... 137/884; 411/84; 403/189; 248/225.11

(58) Field of Classification Search
USPC ............ 137/597, 884, 269–271; 403/189; 411/84; 248/223.41, 224.41, 224.51, 248/224.61, 277.1, 297.21
See application file for complete search history.

(56) References Cited

U.S. PATENT DOCUMENTS

| | | | |
|---|---|---|---|
| 3,513,606 A * | 5/1970 | Jones ............................. | 52/27 |
| 4,224,957 A | 9/1980 | Darves et al. ................. | 137/270 |
| 5,025,834 A | 6/1991 | Stoll ............................. | 137/560 |
| 6,076,543 A * | 6/2000 | Johnson ..................... | 137/15.17 |
| 6,152,175 A * | 11/2000 | Itoh et al. ..................... | 137/602 |
| 6,231,260 B1 * | 5/2001 | Markulec et al. ............. | 403/24 |
| 6,273,139 B1 * | 8/2001 | Ohmi et al. .................. | 137/884 |
| 6,283,155 B1 * | 9/2001 | Vu ................................ | 7/884 |
| 6,394,138 B1 * | 5/2002 | Vu et al. ....................... | 137/884 |
| 6,502,601 B2 * | 1/2003 | Eidsmore et al. ............ | 137/884 |

FOREIGN PATENT DOCUMENTS

| EP | 0928960 A2 | 7/1999 |
|---|---|---|
| EP | 1167846 | 5/2005 |
| FR | 2600751 | 12/1987 |
| JP | 11-002400 | * 1/1999 |
| JP | 2002-206700 | 7/2002 |
| WO | WO99/02867 | 1/1999 |

* cited by examiner

*Primary Examiner* — John Fox
(74) *Attorney, Agent, or Firm* — Kratz, Quintos & Hanson, LLP

(57) ABSTRACT

Rails 20 corresponding to lines A, B, C are provided in parallel on a bass plate 1, and coupling members 21, 22 are slidably mounted on each of the rails 20. Each of fluid controllers 3, 4, 5, 6, 7, 8, 9, 10, 11, 12, 13, 14 is mounted generally on two of these coupling members 21, 22.

1 Claim, 15 Drawing Sheets

FLUID CONTROL DEVICE

BACKGROUND OF THE INVENTION

The present invention relates to fluid control devices for use in semiconductor manufacturing apparatus, and more particularly to integrated fluid control devices from which fluid controllers are removable upward for maintenance inspection.

Throughout the specification and the appended claims, the term "front" refers to the right-hand side of FIGS. 1 and 4, the term "rear" to the left-hand side of these drawings, and the term "upper" and "lower" respectively to the upper and lower sides of the drawings. The terms "left" and "right" are used for the device as it is seen from the front rearward. Such terms are used for convenience sake; the device may be used as reversed with respect to the longitudinal direction, or as laid on its side.

Fluid control devices for use in semiconductor manufacturing apparatus comprise various fluid controllers arranged in rows, wish the fluid channels of fluid controllers in adjacent lines interconnected by connecting means at specified locations. With such fluid control devices, massflow controllers, on-off valves, etc. are integrated without using tubes in recent years. The fluid control device is assembled by attaching block couplings and like coupling members to a single base plate with screws first, and then mounting fluid controllers, such as a massflow controller, filter and on-off valves, on two of these coupling members.

The conventional fluid control device described can be inspected, repaired or otherwise handled for the replacement of components by removing individual fluid controllers upward, whereas the device requires much time for assembly, while full consideration has not been given to the addition installation or modification of lines. Accordingly, if there arises a need to modify the system, all the members must be removed as mounted on the base plate for the replacement with a base plate having the required members mounted thereon. Thus, the conventional device has the problem of necessitating a shutdown of the device for a long period of time and an increased number of steps of work at the site.

SUMMARY OF THE INVENTION

An object of the present invention is to provide a fluid control device which is easy to assemble and which is readily adapted for the additional installation or modification of lines.

As a first feature of the present invention, the invention provides a fluid control device wherein a plurality of lines each comprise a plurality of fluid controllers arranged at an upper level and a plurality of coupling members arranged at a lower level, the plurality of lines being arranged in parallel on a base member and having inlets directed in the same direction, with outlets thereof facing toward the same direction, the fluid control devise being characterized in that each line is mounted on a line support member, the line support member being mounted on the base member and slidable in a direction orthogonal to the line.

The fluid control device embodying the first feature of the invention can be assembled by attaching each line support member having coupling members and fluid controllers mounted thereon to a base member, and is therefore easy to assemble. Lines can be modified by removing channel connecting means upward as required, then removing the old line to be modified as mounted on the line support member, slidingly moving the line support members of the lines not to be modified when so required, mounting on the base member the line support member of the line to be substituted, further slidingly returning the line support members of the lines not to be modified to the proper position, and finally installing channel means as required for modification. Similarly, lines can be additionally installed by removing channel connecting means upward as required, slidingly moving the line support members of the existing lines as required, mounting on the base member the line support member of the line to be added, further slidingly returning the line support members of the existing lines to the proper position, and finally installing channel means as required for addition. Thus, lines can be added or modified easily.

Usable as the line support member is, for example, a plate member elongated longitudinally of the line. When required, a bent portion is provided at each end of the member so that the plate member can be mounted on the base member with ease. The line support member to be used may be any of rails shaped variously. Preferably in this case, the line support member is a rail removably mounted on the base member, and the coupling members are slidably mounted on the rail, each of the fluid controllers being mounted on two of the coupling members. When the coupling members and fluid controllers are to be attached to the line support member in this case, the coupling members are slidingly moved along rail to the required position, and each fluid controller is then mounted on two of the coupling members. Each line is thus easy to assemble. Furthermore, the fluid controller can be replaced by one having a different length by removing the fluid controller to be replaced, moving the coupling member along the rail to the requited position, fixing the coupling member to the rail, and mounting the substitute fluid controller on the coupling members concerned. Similarly, additional fluid controllers and coupling members can be installed in the existing line. In this way, lines can be modified or additionally installed with ease.

According to the first feature of the invention, the rail is, for example, U-shaped in cross section and has inward flanges, and a slide member having an internally threaded portion is connected to the coupling member with a screw member. For example, the slide member having the internally threaded portion is inserted into the rail, and a screw member extending through the coupling member is screwed into the slide member, whereby the upper surface of the slide member is pressed against the inward flanges of the rail from below, whereby the coupling member is attached to the rail.

As a second feature of the present invention, the invention provides a fluid control device wherein a plurality of lines each comprise a plurality of fluid controllers arranged at an upper level and a plurality of coupling members arranged at a lower level, the plurality of lines being arranged in parallel on a base member and having inlets directed in the same direction, with outlets thereof facing toward the same direction, the fluid control device being characterized in that the base member is provided with tracks arranged in parallel and corresponding to the respective lines, the coupling members being slidably mounted on the corresponding track, each of the fluid controllers being mounted on two of the coupling members.

According to the second feature of the invention, the fluid control device can be assembled by slidingly moving the coupling members along the track to the required position, and thereafter mounting each of the fluid controller on the corresponding pair of these coupling members. Thus, the device is easy to assemble.

Furthermore, the fluid controller can be replaced by one having a different length by removing the fluid controller to be replaced, moving the coupling member along the track to the required position, fixing the coupling member to the track, and mounting the substitute fluid controller on the coupling members concerned. Similarly, additional fluid controllers and coupling members can be installed in the existing line. In this way, lives can be modified or additionally installed with ease.

Preferably, slide members corresponding to the respective coupling members are provided on the track, and each of the slide members is connected to the corresponding coupling member. The track and the slide member can be modified variously insofar as the slide member is slidable along the track and will not readily slip off from the track. For example, the track may be provided by a rail removably counted on the base member, or the track may be provided by a groove in the upper surface of the base member. The former is more preferable.

When the tracks are provided by removable rails, the device can be assembled in its entirely by mounting on the base member the individual rails each having coupling members and fluid controllers mounted thereon. The device is therefore easy to assemble. Lines can be modified merely by removing channel connecting means upward as required, removing the old line to be modified as mounted on the rail, mounting the rail of the substitute line on the base member, and finally installing channel connecting means as required for modification. Similarly, lines can be added merely by removing channel connecting means upward as required, thereafter mounting on the base member the rail of the line to be added, and finally installing channel connecting means as required for the additional installation. Thus, lines can be added or modified easily.

According to the second feature of the invention, the rail for providing the line support member or track may be U-shaped in cross section and have inward flanges, or may be U-shaped in cross section and provided with outward flanges. Alternatively, the rail may be U-shaped in cross section and provided with a T-shaped intermediate wall dividing the rail widthwise thereof. Preferably, the groove may have a downwardly enlarged trapezoidal cross section or an inverted T-shaped cross section.

The slide member may be attached to the rail with a screw member or provided with rail holding claws engageable with the rail.

For example, the rail is U-shaped in cross section and has inward flanges, and a slide member having an internally threaded portion is connected to the coupling member with a screw member. For example, the slide member having the internally threaded portion is inserted in the rail, and A screw member extending through the coupling member is screwed in the slide member, whereby the upper surface of the slide member is pressed against the inward flanges from below to attach the coupling member to the rail. When the track is provided by a groove instead of the rail, an edge portion defining the opening of the groove is preferably provided with a portion for preventing the slide member from slipping off upward. The slipping-off preventing portion is readily available by shaping the groove in a downwardly enlarged trapezoidal form or inverted T-shaped form. In the case where the track is either a rail or groove, a clearance is preferably formed between each adjacent pair of fluid controllers for inserting therethrough a tool for rotating the screw.

The rail is U-shaped in cross section and has outward flanges, and the slide member is provided with rail holding claws engageable with the respective outward flanges of the rail. Alternatively, the rail is U-shaped in cross section and has inward flanges, and the slide member is provided with rail holding claws engageable with the respective inward flanges of the rail. Preferably, the slide member provided with the rail holding claws is provided, for example with an internally threaded portion, connected to the coupling member with a screw member and further fixed as positioned in place to the rail.

Preferably, the adjacent rails are connected to one another at a required position. This eliminates variations in the spacing between the rails, prevents the rails from backlashing and renders the device as assembled easy to use.

According to the first and second features of the invention, the base member is shaped in the form of a frame by an inlet-side rail, an outlet-side rail and connecting members interconnecting the side rails, using rails for providing line support members or tracks. Rails may also be used as the connecting members in this case.

DESCRIPTION OF THE PREFERRED EMBODIMENTS

Embodiments of the invention will be described below with reference to the drawings.

Figure 1:
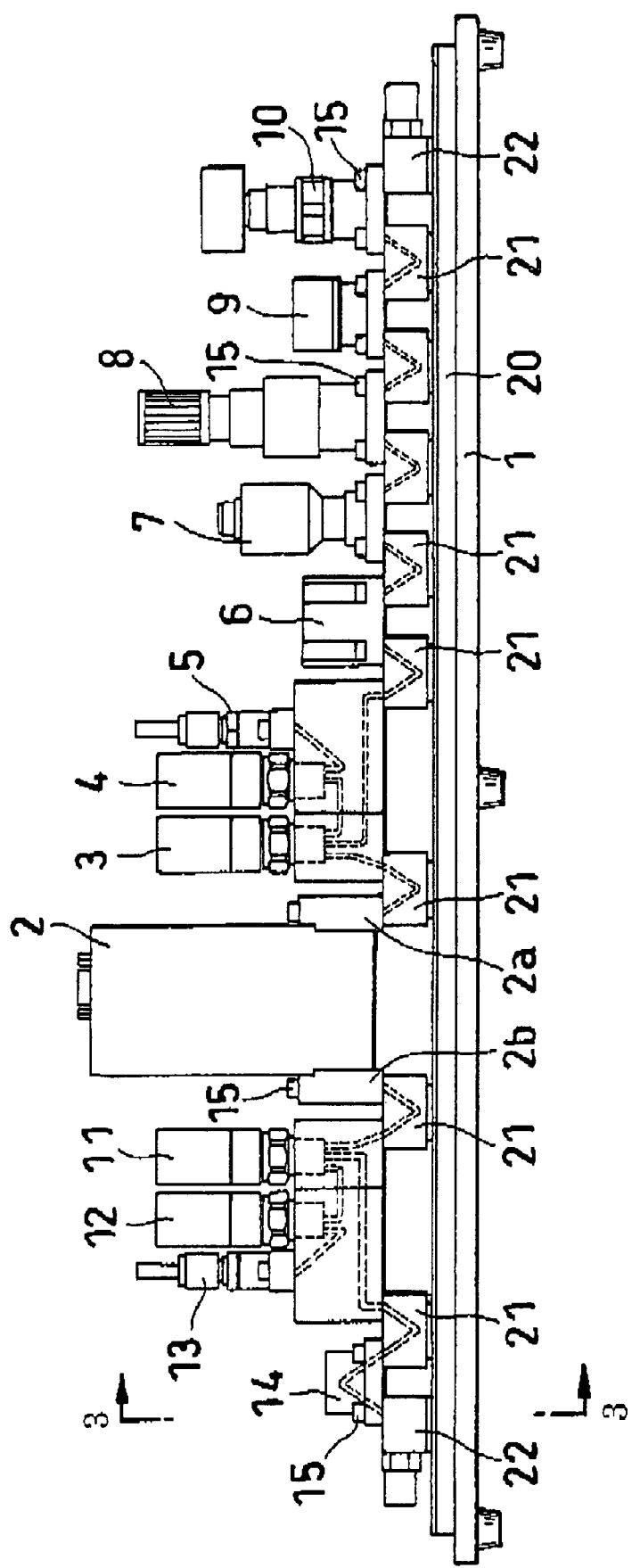
FIG. 1 is a side elevation shoving a first embodiment of fluid control device of the invention.
Figure 2:
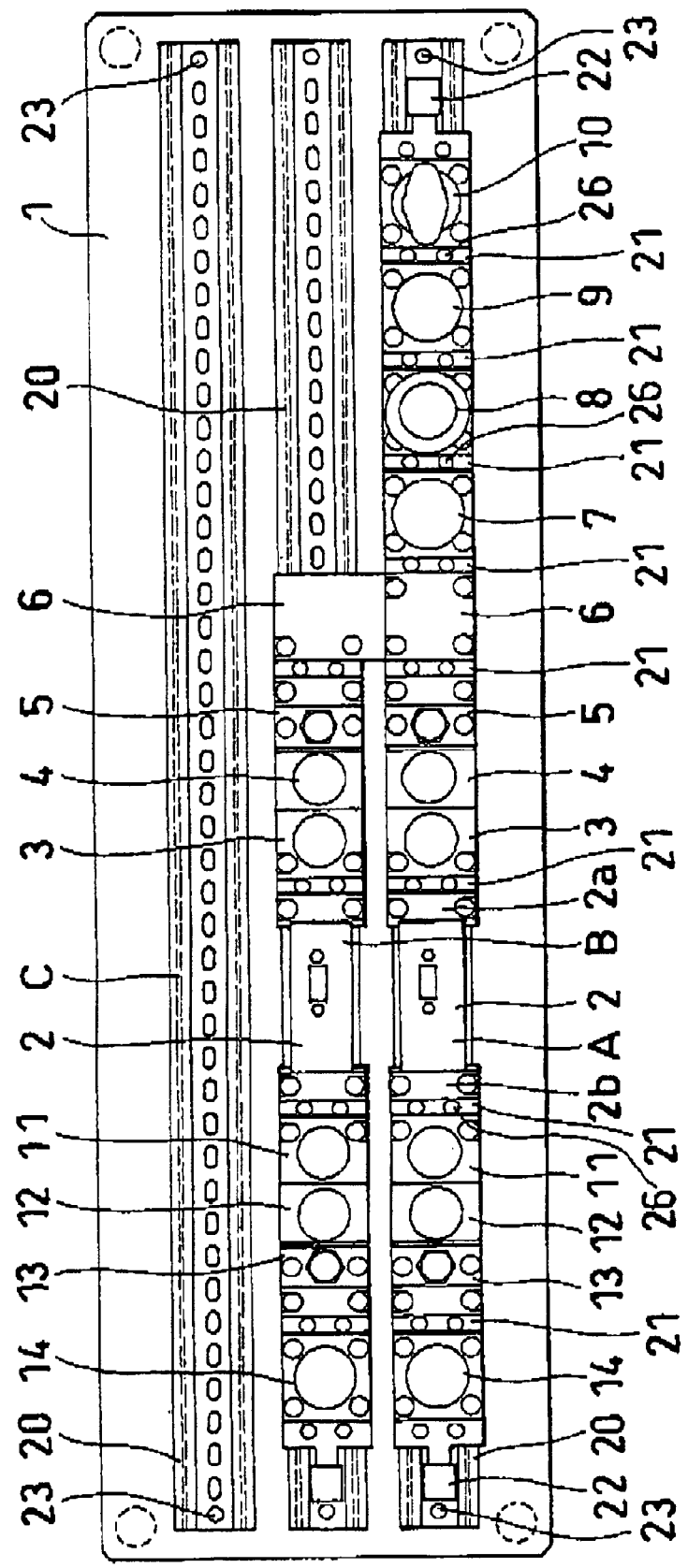
FIG. 2 is a plan view of the same.
Figure 3:
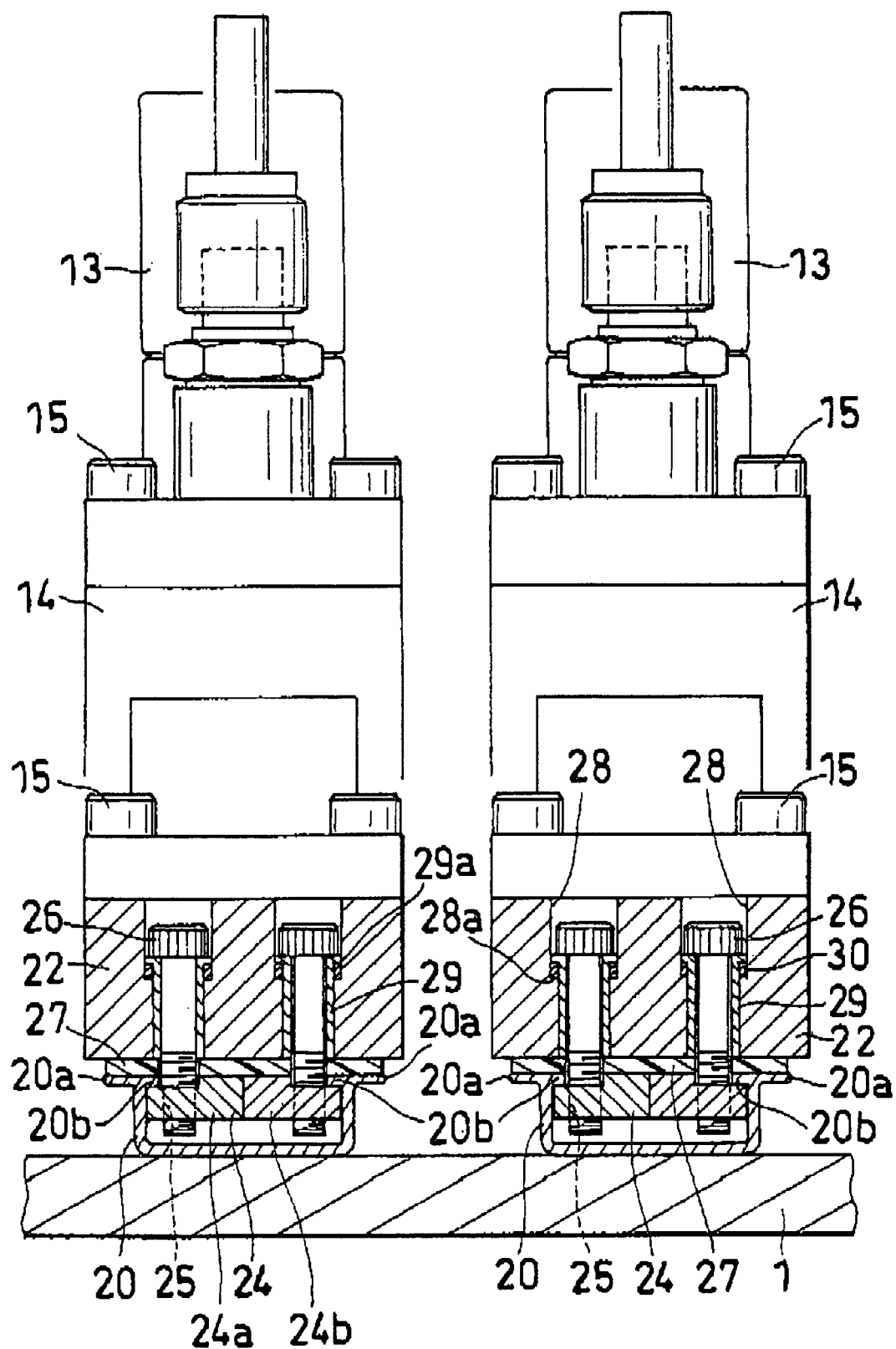
FIG. 3 is a view in section taken along the line III-III in FIG. 1.

FIGS. 1 to 3 show a first embodiment of fluid control device of the invention. The device comprises a first line A, second line B and spare line C which are arranged in parallel on a base member 1 in the form of a plate.

The first line A and the second line B comprise fluid controllers 2, 3, 4, 5, 6, 7, 8, 9, 10, 11, 12, 13, 14, such as massflow controller, on-off valves, pressure regulators, channel blocks, which are arranged at a higher level and coupling members 21, 22 arranged at a lower level and holding these fluid controllers 2 to 14 in communication with one another. The coupling members 21, 22 at the lower level are mounted on a rail 20 for each of the lines A, B. The fluid controllers 2 to 14 at the upper level are each mounted generally on the corresponding adjacent pair of the coupling members 21, 22. Only the rail 20 is provided for the spare line C.

The fluid controllers of the first line A are massflow controller 2, the components arranged in front (at the inlet side) of the massflow controller 2, i.e., inlet first on-off valve 3, inlet second on-off valve 4, check valve 5, lateral communication channel block 6, pressure sensor 7, pressure regulator 8, filter 9 and manual valve 10, and the components provided in the rear (at the outlet side) of the massflow controller 2, i.e., outlet first on-off valve 11, outlet second on-off valve 12, check valve 13 and branching-confluence through channel block 14.

The fluid controllers of the second line B are massflow controller 2, the components arranged in front (at the inlet side) of the massflow controller 2, i.e., inlet first on-off valve 3, inlet second on-off valve 4, check valve 5, and lateral communication channel block 6, and the components provided in the rear (at the outlet side) of the massflow controller 2, i.e., outlet first on-off valve 11, outlet second on-off valve 12, check valve 13 and branching-confluence through channel block 14.

The massflow controller 2 has an inlet connecting portion 2a and an outlet connecting portion 2b respectively at the front and rear sides of its lower end portion. The massflow controller 2 is held in communication with the inlet first on-off valve 3 and the outlet first on-off valve 11 by a block couplings 21 having a V-shaped channel and disposed under these respective valves. The other adjacent fluid controllers 4, 6, 7, 8, 9, 10, 12, 14 are held in communication with one another by like block couplings 21 having a V-shaped channel. The manual valve 10 positioned at the inlet end of the line A and the branching-confluence through channel block 14 at the outlet end of each of the lines A, B are each provided with a coupling 22 for connection to an external member.

The rail 20 has a through hole in each of its front and rear ends and is fastened to the base member 1 by a screw 23 inserted through the hole. The block couplings 21 and the external member connecting couplings 22 have vertical internally threaded portions formed in their upper walls. Each of the fluid controllers 2, 3, 4, 5, 6, 7, 8, 9, 10, 11, 12, 13, 14 is attached to the coupling 21 or 22 by driving a screw 15 inserted through the controller into the internally threaded portion of the coupling 21 or 22.

With reference to FIG. 3, the rail 20 is U-shaped in cross section, and has outward flanges 20a and inward flanges 20b. The rail 20 has a slide member 24 inserted therein. The slide member 24 is made of metal and divided in two, i.e., into left and right half segments 24a, 24b, so as to be insertable into the rail 20 from above. Screws 26 extending through couplings 21 or 22 are screwed in vertical internally threaded portions 25 extending through the hall segments 24a, 24b. A stepped portion is formed in the upper surface of each of the half segments 24a, 24b so as to form a lower portion at the outer side thereof. The vertical threaded portion 25 is formed in the lower portion of each half segment. The slide member 24 is slidable with the screw 26 loosely screwed in the internally threaded portion 25 but is nonrotatable. When the screw 26 is tightened up in this state, the slide member 24 is moved upward inside the rail 20, and the lower portion of upper surface of the slide member 24 is pressed against the lower surface of the inward flange 20b of the rail 20, whereby the coupling 21 or 22 is fixed to the rail 20. A washer 27 is interposed between the lower surface of the coupling 21 or 22 and the upper surface of the rail 20, with the higher portion of upper surface of the slide member 24 in contact with the lower surface of the washer 27. A screw insertion hole 28 formed in the coupling 21 or 22 has a stepped portion 28a. A cylindrical spacer 29 having a flange 29a at its upper end is fitted around the shank of the screw 26, and a cylindrical elastic member 30 is provided between the flange 29a of the spacer 29 and the stepped portion 28a of the insertion hole 28. To make the screw 26 rotatable from above for attaching the block coupling 21 to the rail 20, a wrench insertion clearance is formed above the midportion of the block coupling 21 between each adjacent pair of fluid controllers 2 to 14.

The slide member 24 in the foregoing embodiment may be an integral piece instead of being divided in two. In this case, the slide member 24 is inserted into the rail 20 from one of its front and rear ends.

Figure 4:
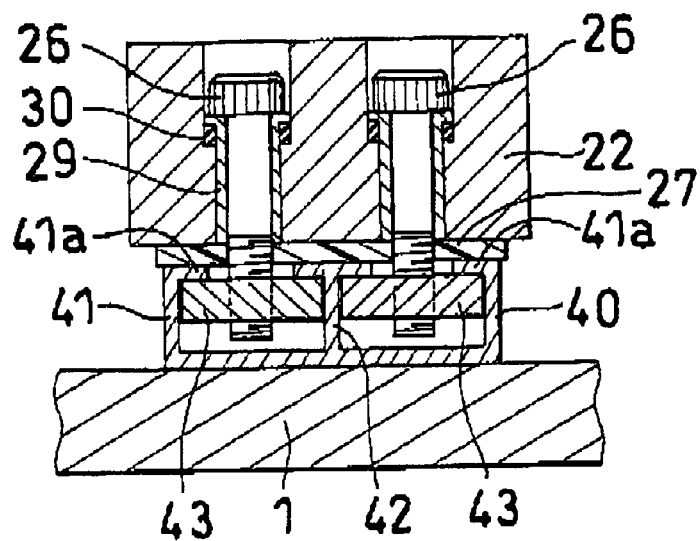
FIG. 4 is a fragmentary view in section showing a second embodiment of fluid control device of the invention.

The rail is not limited particularly in shape but can be modified variously. FIG. 4 shows an example. With reference to the second embodiment shown in the drawing, the rail 40 shown is E-shaped in cross section with its open side up. More specifically, the rail comprises a rail body 41 U-shaped in cross section and having inward flanges 41a, and a T-shaped intermediate wall 42 provided in the widthwise midportion thereof and dividing the body 41 widthwise thereof. In this case, a pair of opposite slide members 43 are provided which are rectangular parallelepipedal. As in the foregoing embodiment, the slide member is fastened to the rail 40 by being moved upward by a screw member 26 screwed into the slide member.

Figure 5:
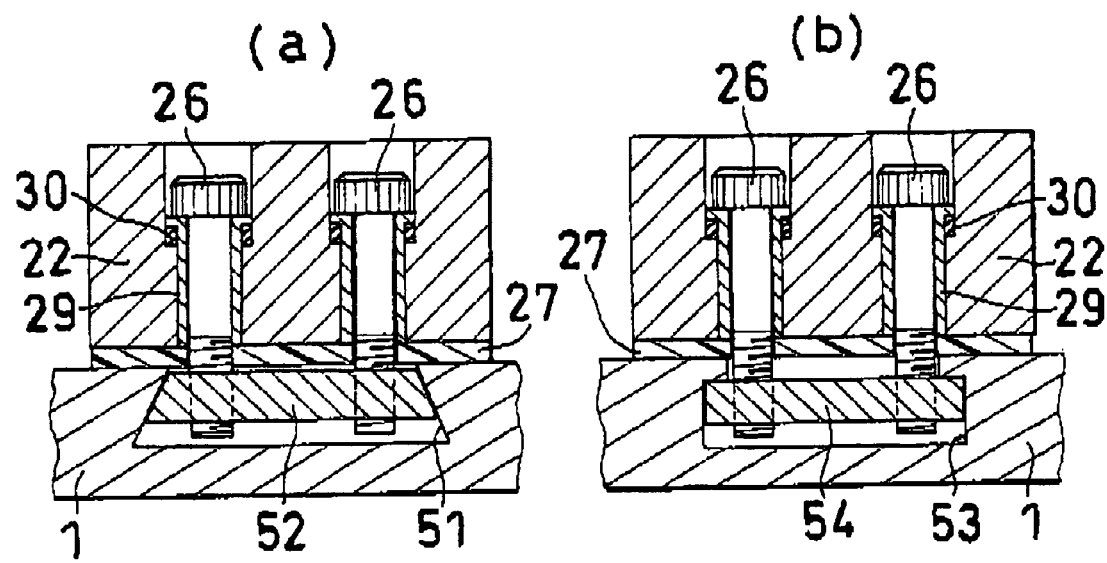
FIG. 5 includes fragmentary views in section showing third embodiments of fluid control device of the invention.

The rails 20, 40 each provide a track for each of the lines A, B and C for moving the coupling member therealong. Instead of these rails 20, 50, a groove 51 or 53 for guiding a slide member 52 or 54 may be formed in the upper surface of the base member 1 to provide a track by the groove 51 or 53 as shown in FIG. 5. With reference to the third embodiments shown in FIGS. 5, (a) and (b), the groove 51 in (a) is a dovetail groove having a downwardly enlarged trapezoidal cross section, while the groove 63 shown in (b) is an internally enlarged groove having an inverted T-shaped cross section. In the case of (a), the slide member 52 is a block having a downwardly enlarged trapezoidal cross section. The slide member 54 in (b) is in the form of a rectangular parallelepipedal block which can be accommodated in the enlarged portion of the internally enlarged groove 53. In the case of either (a) or (b), the slide member 52 or 54 is moved up by the screw member 26 driven in and pressed against the edge of the grooved portion 51 or 53 defining an opening.

With the fluid control devices of the first to third embodiments, the device is assembled in its entirety by sliding moving the coupling members 21, 22 along the tracks (the rails 20 or 40 or the grooves 51 or 53) to arrange the coupling members in position, and thereafter mounting each of the fluid controllers 2 to 14 generally on corresponding adjacent pair of the coupling members 21, 22. Thus, the device is easy to assemble.

For example when the second line B is to be built with the same construction as the first line A, the couplings 21, 22 required for connecting the fluid controllers 7, 8, 9, 10 to be added are placed on the track 20, 40, 51 or 53 from the front end thereof and then slidingly moved to the specified position along the track, and the fluid controllers are thereafter mounted on the couplings. When the line is fabricated according to the first or second embodiment, the couplings can be mounted alternatively from above the track. Further if the massflow controller 2, for example, is to be replaced by one which is different in length along the line, the fluid controllers 3 to 14 need not be removed but the coupling members 21, 22 are loosened, then slidingly moved to the required position along the track 20, 50, 51 or 53 and thereafter fixed to the track, followed by installation of the desired fluid controller. During this procedure, the coupling members on the existing line remain attached to the track and are prevented from slipping off or becoming lost. When an additional unit is to be inserted anew between the fluid controllers, the same procedure as for the replacement of the massflow controller 2 can be performed. In this way, the lines can be modified easily.

Figure 6:
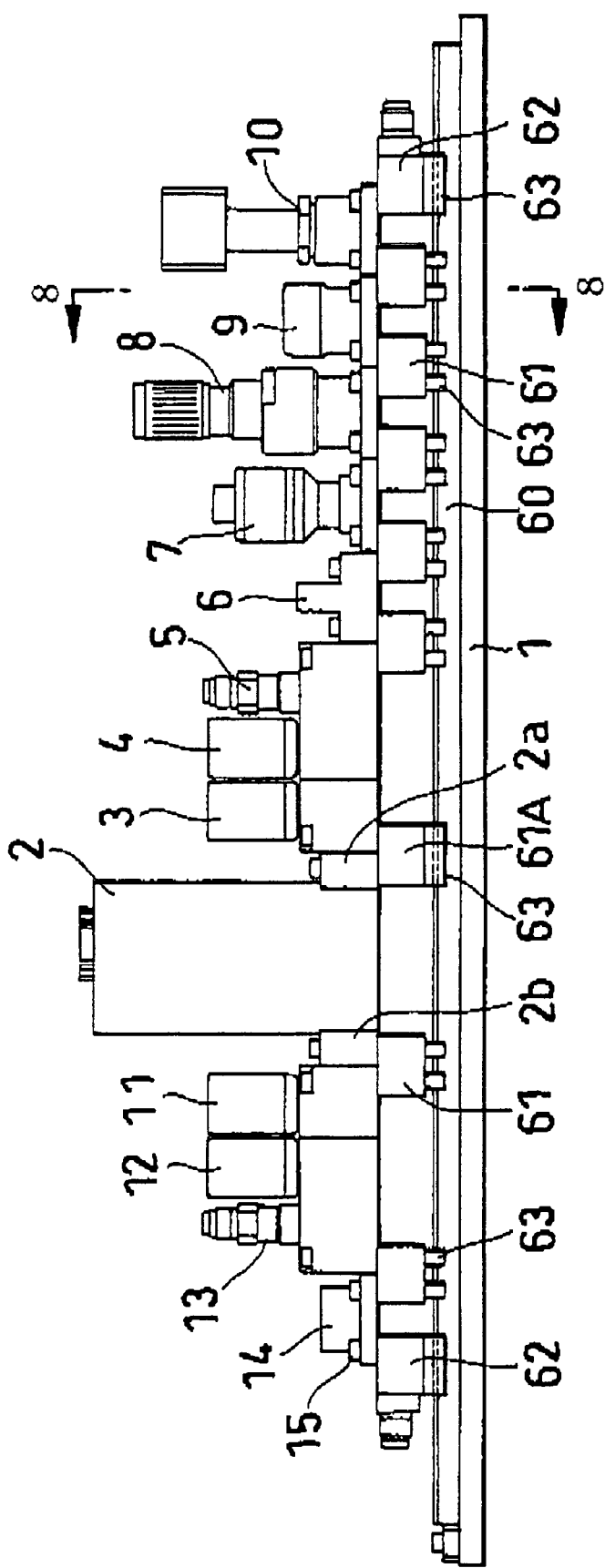
FIG. 6 is a side elevation showing a fourth embodiment of fluid control device of the invention.
Figure 7:
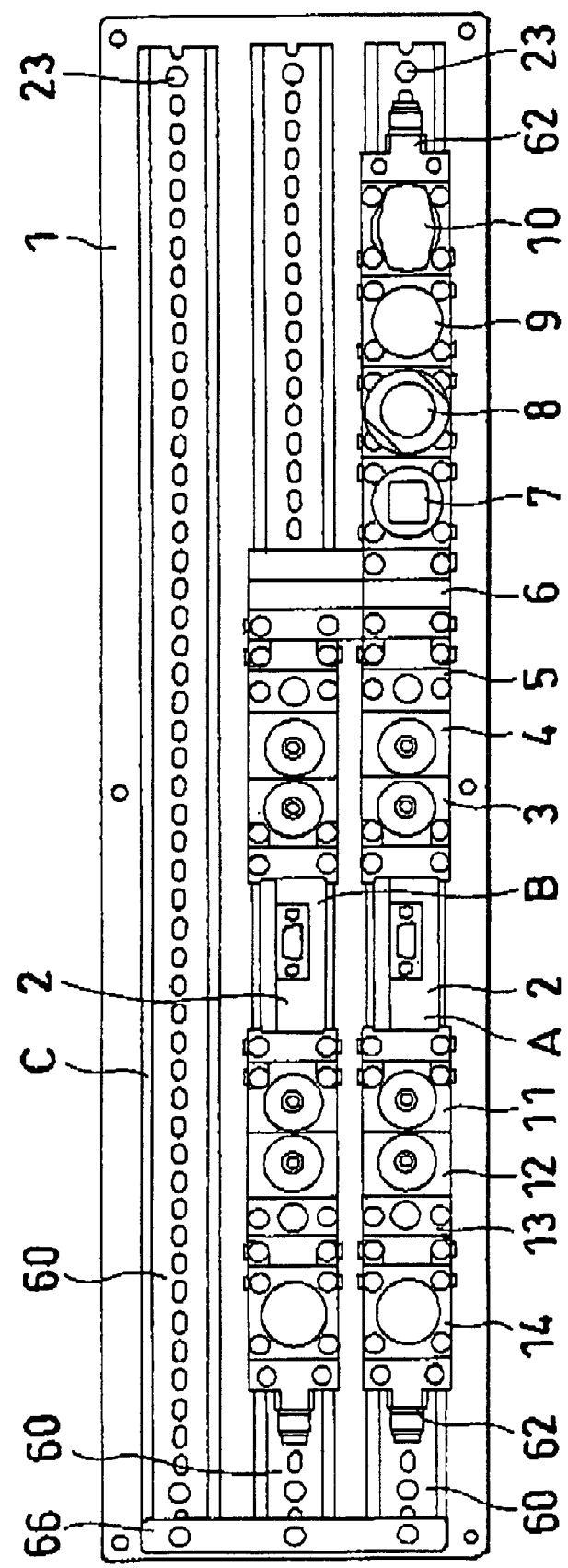
FIG. 7 is a plan view of the same.
Figure 8:
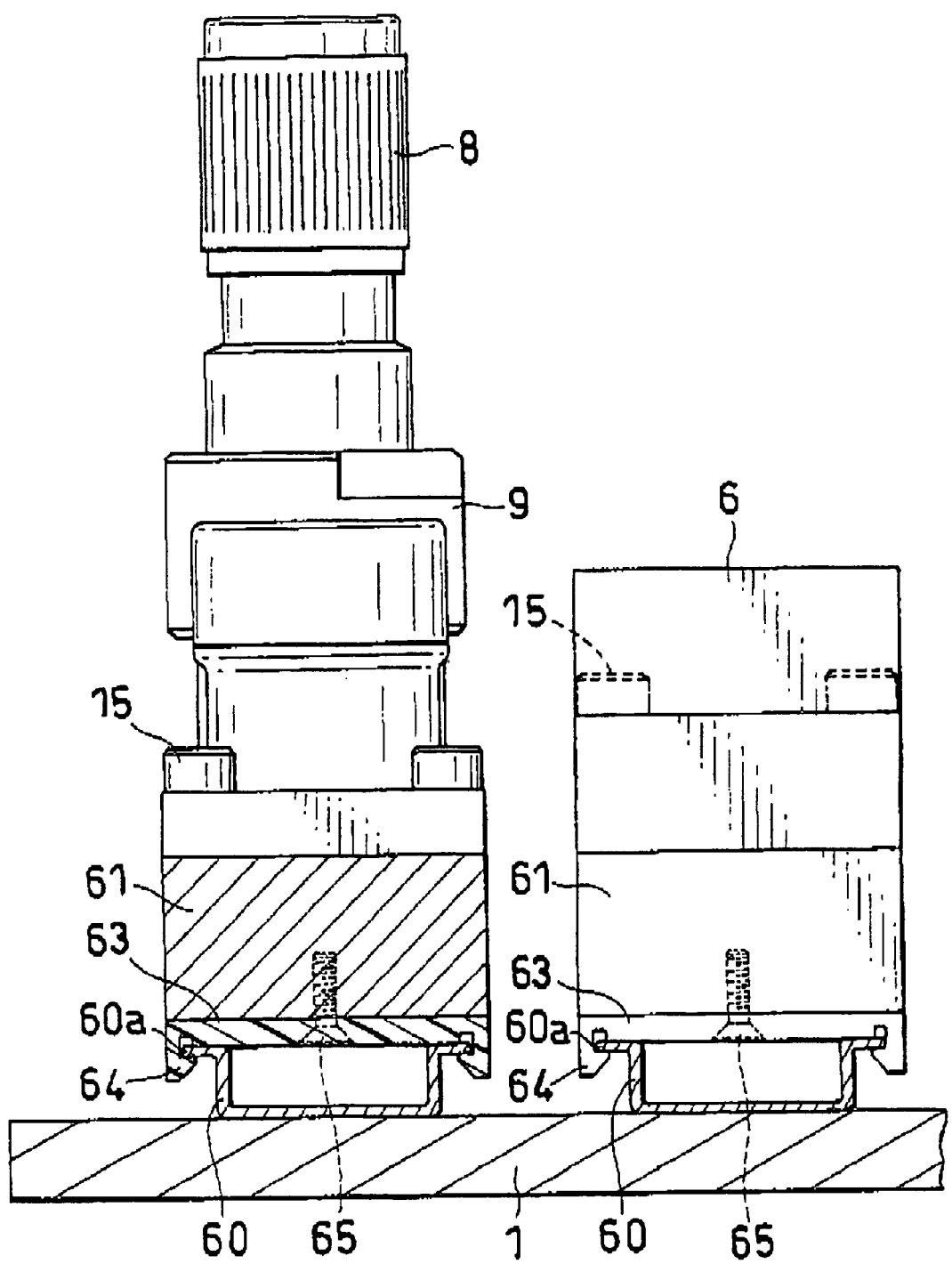
FIG. 8 is a view in section taken along the line VIII-VIII in FIG. 6.

FIGS. 6 to 8 show a fourth embodiment of fluid control device of the invention, which is the same as the first embodiment in the parallel arrangement of the first line A, second line B and spare line C on the base member 1, and in the arrangements of the fluid controllers 2 to 14 on the first and second lines A, B. Throughout FIGS. 1 to 8, like parts are designated by like reference numerals or symbols and will not be described repeatedly.

With reference to FIG. 6, block couplings 61 and external member connecting couplings 62 at a lower level are slightly modified in shape from those of the first embodiment. As shown in detail in FIG. 8, a synthetic resin slide member 63 having rail holding claws 64 is fixed with a screw 65 to the lower end of each of the couplings 61, 62. A rail 60 is U-shaped in cross section and has outward flanges 60a only but no inward flanges. The slide member 63 is inverted U-shaped and is provided at its lower end with the rail holding claws 64 which face inward and are in engagement with the respective outward flanges 60a of the rail 60. The rail holding claws 64 have such elasticity as to be openable laterally away from each other. In this way, the couplings 61, 62 are slidable along the rail 60, usually prevented from slipping off the rail upward and made forcibly removable upward. To prevent the couplings 61, 62 as assembled from moving forward or rearward, the outer member connecting couplings 62 at the inlet and outlet and the inlet coupling 61A of the massflow controller 2 each have a slide member 63 which is secured to the rail 60.

With reference to FIG. 7, the three rails 60 of the fourth embodiment are connected to one another at their rear ends by a connecting member 56. This prevents variations in the spacing between the rails 60, further precluding the rails 60 from backlashing and the components from slipping off from the rails 60.

According to the fourth embodiment, the rails 60 are not limited specifically in shape but can be altered variously. Although the rails 50 are different from those of the first embodiment in shape, the same rails 20 as in the first embodiment are of course usable. Also usable are a rail 70 and a slide member 71 which are so shaped as shown in FIG. 9.

Figure 9:
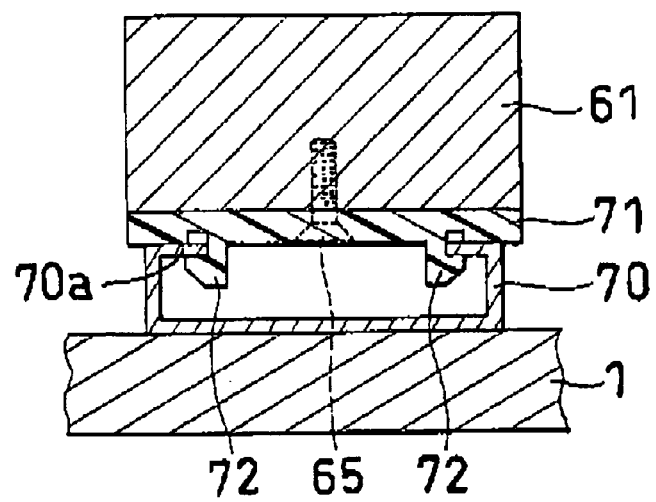
FIG. 9 is a fragmentary view in section showing a fifth embodiment of fluid control device of the invention.

With the fifth embodiment shown in FIG. 9, the rail 70 is U-shaped in cross section, has inward flanges 70a only but has no outward flanges. The slide member 71 is provided with outward rail holding claws 72 engageable with the respective inward flanges 70a of the rail 70. The rail holding claws 72 have such elasticity as to be deformable inward toward each other. In this way, couplings 61, 52 are slidable along the rail 70, usually prevented from slipping off upward and made forcibly removable upward.

Although made of synthetic resin, the slide members 63, 71 of the fourth and fifth embodiments may alternatively be those made of metal and given such elasticity au to be openable laterally in opposite directions.

Figure 10:
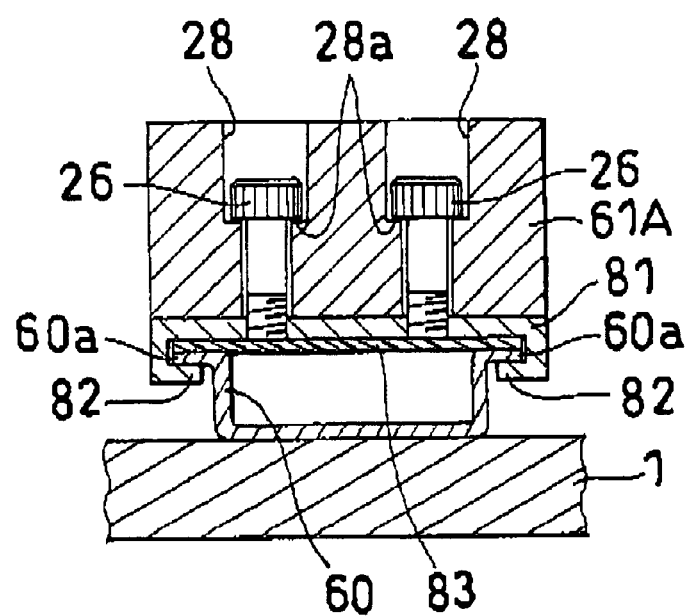
FIG. 10 is a fragmentary view in section showing a sixth embodiment of fluid control device of the invention.

The slide member may be made of a metal and so shaped as shown in FIG. 10 (sixth embodiment). With reference to this drawing, the rail 60 and the coupling 61, 61A or 62 used are the same as those of the fourth embodiment. The slide member 81 is inverted U-shaped and provided with inward rail holding claws 82 at its lower end. The slide member 81 is mounted on the rail 60 from one of the front and rear ends thereof, moved to the required position and then fixed with screw members 26. The screw members 26 are screwed into vertical internally threaded portions extending through the slide member 81, tightened up against the outward flanges 60a of the rail 60, with a washer 83 interposed between the member 81 and rail flanges 60a, whereby the couplings 61, 61A or 62 is prevented from moving. The screw insertion holes 28 formed in the coupling 61, 61A or 62 each have a stepped portion 28a as in the first embodiment, whereas neither the spacer 29 nor the elastic member 30 is used.

The slide member 81 of the sixth embodiment is usable in combination with the slide member 63 of the fourth embodiment. More specifically, the slide members for the outer member connecting couplings 62 at the inlet and cutlet and for the inlet coupling 61A of the massflow controller 2 are those 81 of the sixth embodiment, and the other slide members are those 63 of the fourth embodiment. The couplings assembled into the device are then prevented from moving forward or rearward, while the coupling 61 provided with the slide member 63 of the fourth embodiment is removable upward without being moved to the end of the rail 60. This ensures facilitated modification of the lines or addition of lines.

With the fluid control devices of the fourth to sixth embodiments, the device is assembled in its entirety by slidingly moving the coupling members 61, 62 along the tracks (rails 60 or 70) to arrange the coupling members in position, and thereafter mounting each of the fluid controllers 2 to 14 generally on two of the coupling members 61, 62. Thus, the device is easy to assemble.

For example when the second line B is to be built with the same construction as the first line A, the couplings 61, 62 required for connecting the fluid controllers 7, 8, 9, 10 to be added are placed on the track 60 or 70 from the front end thereof and then slidingly moved to the specified position along the track, and the fluid controllers are thereafter mounted on the couplings. When the line is fabricated according to the fourth or fifth embodiment, the slide members 63 or 71 can be mounted alternatively from above the track. Additional units or components can be inserted between the fluid controllers similarly, and the lines can be modified easily.

According to the first, second, fourth, fifth and sixth embodiments, each track is provided by a rail 20, 40, 60 or 70 removably mounted on the base member, so that the device can be assembled in its entirety by attaching to the base member 1 the rails each having coupling members 21, 22 or 61, 62 and fluid controllers 2 to 14 mounted thereon, hence easy assembly. Lines can be modified by a procedure comprising removing channel connecting means upward as required, thereafter removing the old line to be modified as mounted on the rail, mounting the rail of a substitute line on the base member, and finally installing channel connecting means as required for the modification. Similarly, lines can be added merely by removing channel connecting means upward as required, thereafter mounting on the base member the line to be added as mounted on a rail, and finally installing channel connecting means required for the additional installation. Lines can therefore be added or modified with ease.

Figure 11:
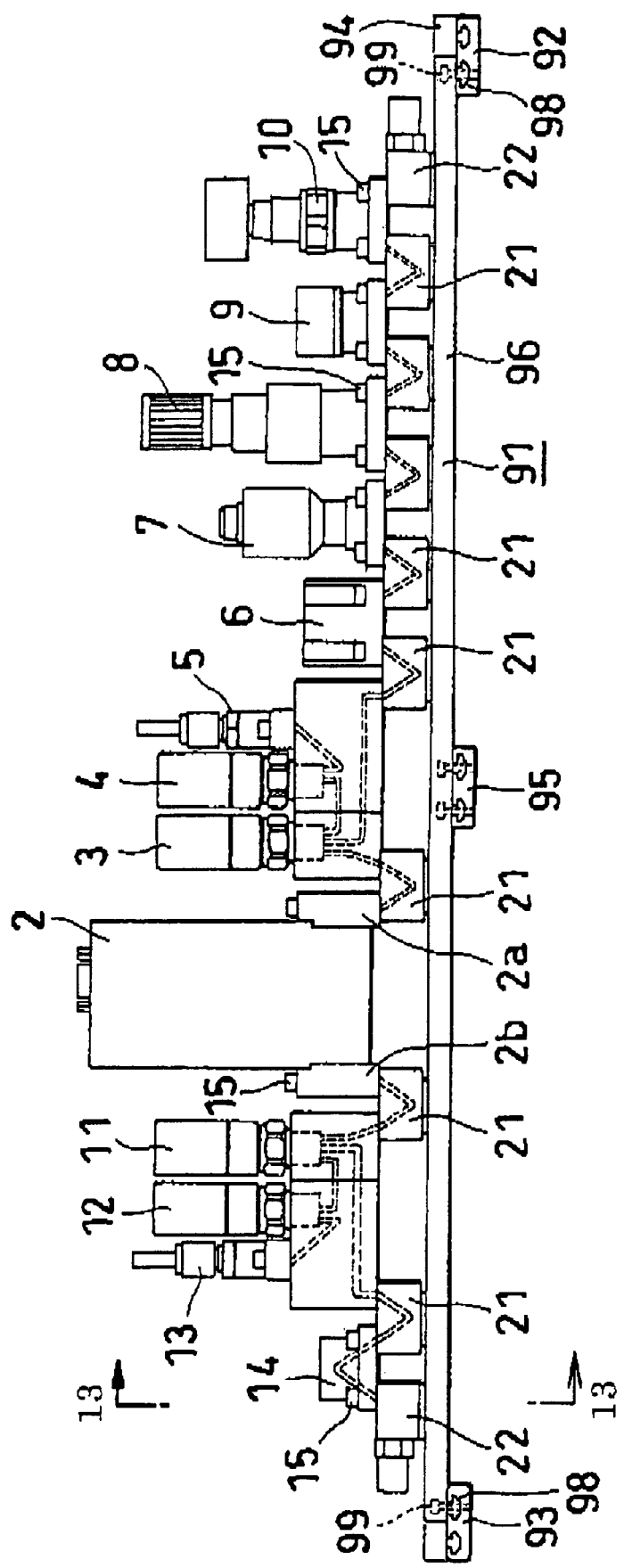
FIG. 11 is a side elevation showing a seventh embodiment of fluid control device at the invention.
Figure 12:
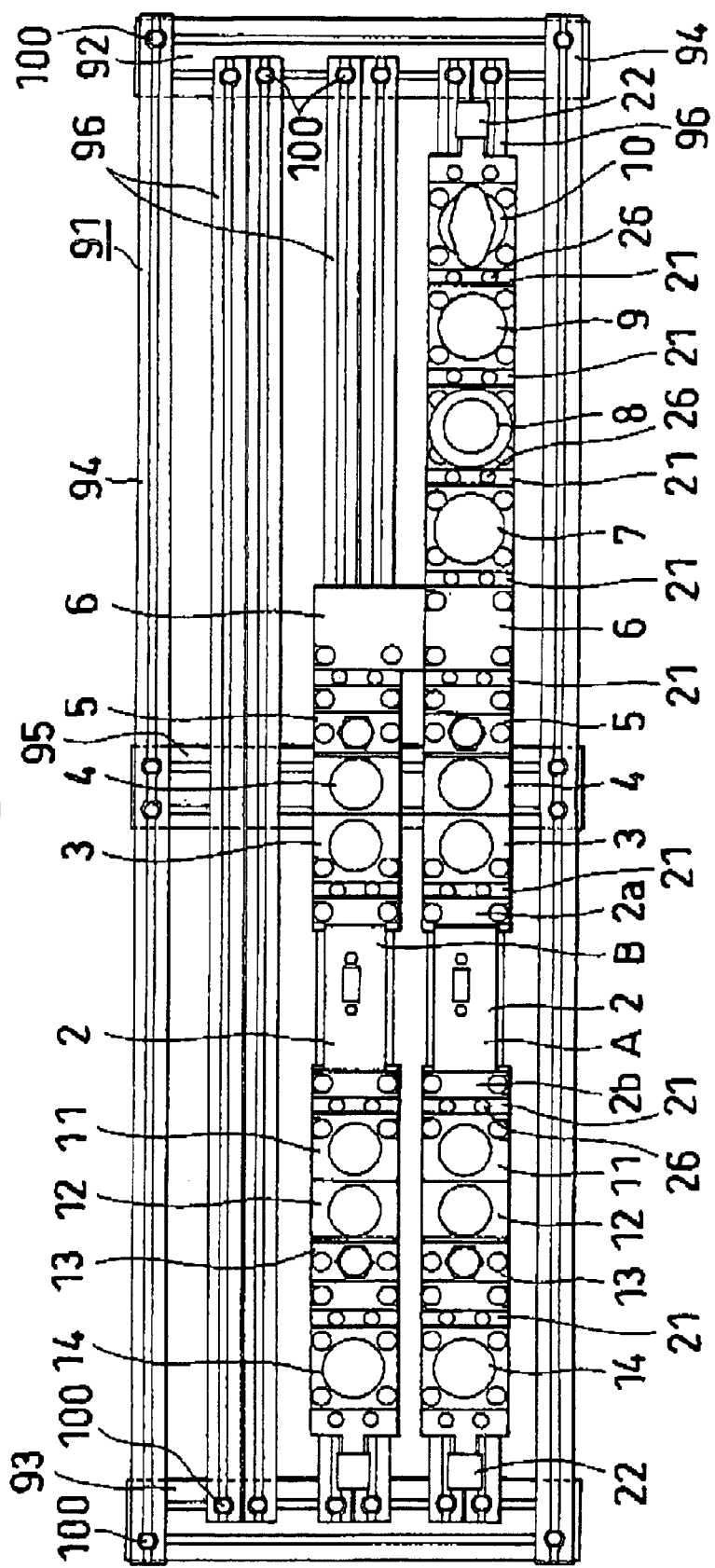
FIG. 12 is a plan view of the same.
Figure 13:
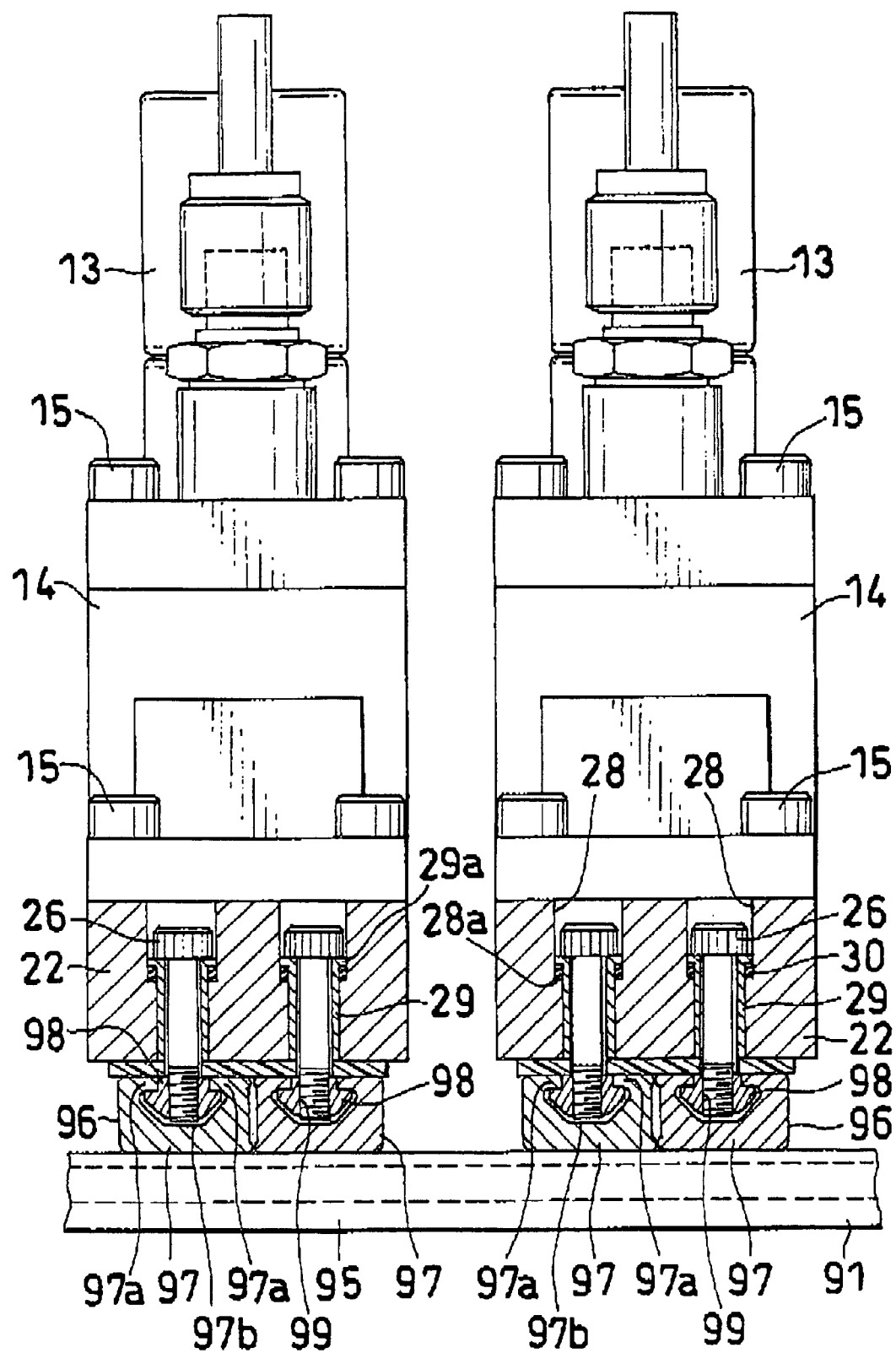
FIG. 13 is a view in section taken along the line XIII-XIII in FIG. 11.

The base member 1 is in the forms of a plate according to the foregoing embodiments, whereas the base member may be in the fore of a frame as seen in FIGS. 11 to 13.

With reference to the seventh embodiments shown in these drawings, a base member 91 comprises an inlet-side rail 92, outlet-side rail 93, connecting member 94 interconnecting the two rails 92, 93, and an intermediate rail 95 provided between intermediate portions of the rails 92, 93. Coupling members 21 22 at a lower level are mounted on a line supporting rail 96 for each of lines A, B. Each of fluid controllers 2 to 14 at a higher level is mounted generally on the corresponding adjacent par of these couplings 21, 22.

Figure 14:
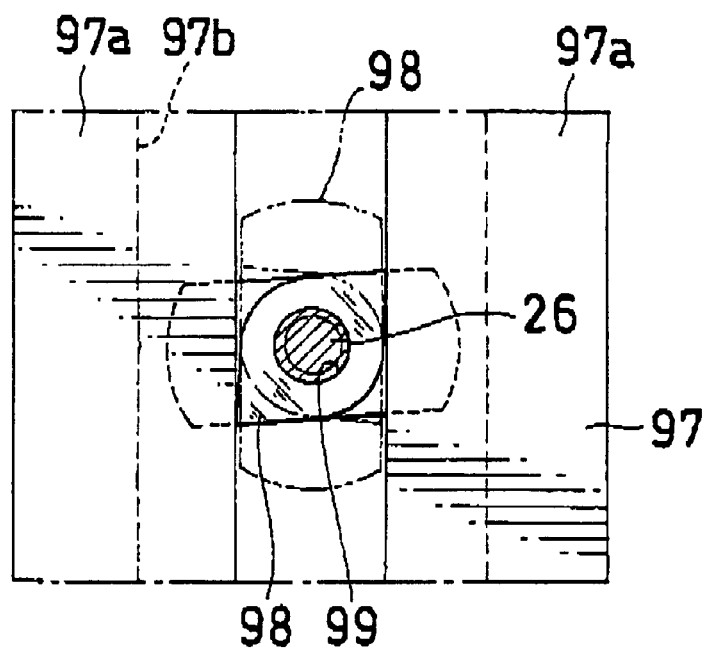
FIG. 14 is an enlarged view in horizontal section taken along the upper surface of a rail in FIG. 13.

As shown in FIG. 13, the line supporting rail 96 of the present embodiment for each of the lines A, B comprises two shape members 97 each having a single groove and arranged side by side. Each shape member 97 has inward flanges 97a and an inside groove 97b having a downwardly tapered trapezoidal cross section. In conformity with this section, a slide member 98 also has a downwardly tapered trapezoidal cross section. The slide member 98 has a vertical internally threaded portion 99. A screw 26 extending through the coupling 21 or 22 is screwed in the internally threaded portion 99. The slide member 98 has an axial length smaller than the end-to-end distance between the inward flanges 97a of the shape member 97. With reference to FIG. 14, the slide member 98 in screw-thread engagement with the screw 26 is fitted, as rotated through 90 deg from the state shown in FIG. 13, into the groove 97b (as indicated in two-dot chain line), and thereafter rotated through 90 deg (solid-line or broken-line state), whereby the slid member can be temporarily held in place.

A shape member of the two-groove type obtained by joining two shape members 97 of the single-groove type is used as it is for the inlet-side rail 92, outlet-side rail 93 and intermediate rail 95. The same shape member 97 of the single-groove type as used for providing the line supporting rail 96 is used for the connecting members 94 interconnecting the inlet-side rail 92 and the outlet-side rail 93.

The line supporting rail 96 is attached to the rails 92, 93 in the same manner as when the coupling member 21 or 22 is attached to the rail 96. Stated more specifically, the line supporting rail 96 has front and rear end portions which are prepared by spot facing. Screw members 100 inserted respectively through these end portions are screwed in slide members 98 provided in the inlet-side and outlet-side rails 92, 93, whereby the line supporting rail 96 is made slidable in a direction (left-right direction) orthogonal to the line (front-rear direction).

The connecting member 94 is connected to the inlet-side rail 92, the outlet-side rail 93 and the intermediate rail 95 by the same means as above and is thereby made slidable on these rails 92, 93, 95.

Figure 15:
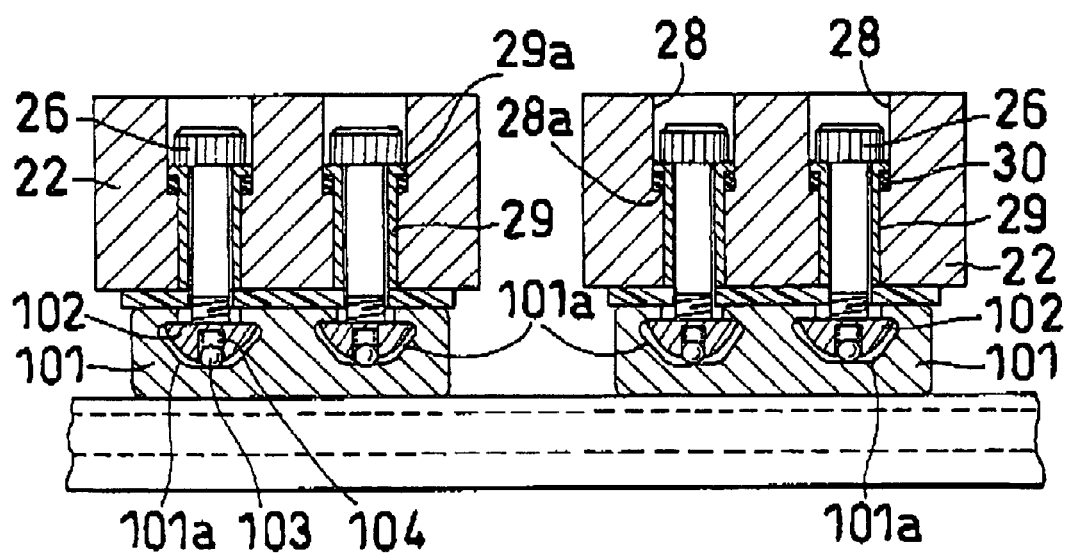
FIG. 15 is a view in section showing an eighth embodiment of fluid control device of the invention.
Figure 16:
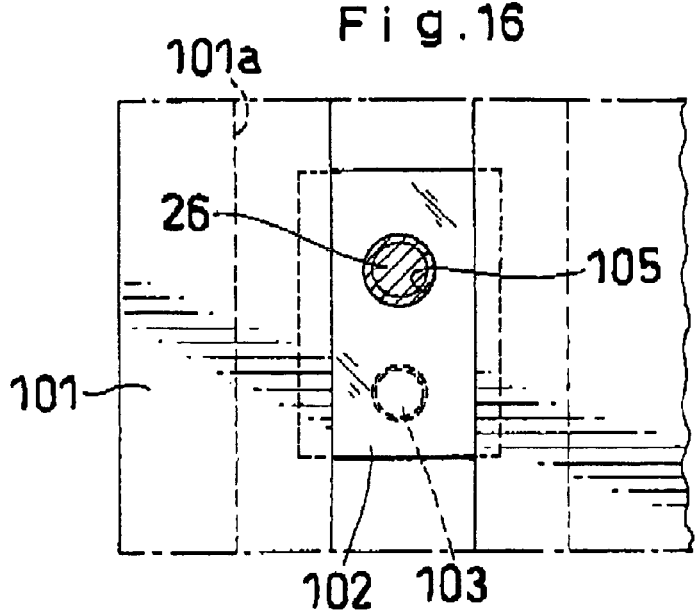
FIG. 16 is an enlarged view in section taken along the upper surface of a rail in FIG. 15.

FIGS. 15 and 16 show a modification of the seventh embodiment, i.e., eighth embodiment. With reference to these drawings, a line supporting rail 101 of the embodiment is provided by a two-groove shape member which comprises two shape members 97 of the single-groove type as joined together. The rail 101 has inside thereof two grooves 101a each having a downwardly tapered trapezoidal cross section. In conformity with this cross section, a slide member 102 also has a downwardly tapered trapezoidal cross section. The slide member 102 has incorporated therein a plunger 103 biased downward by a spring 104. The plunger 103 bears on the bottom face of the grooved portion 101a, whereby the slide member 102 is pushed upward. Accordingly, the slide member 102 is temporarily held in place before a screw 26 is screwed into a vertical internally threaded portion 105 of the slide member 102.

When lines are to be modified or added according to the seventh or eighth embodiment, it is possible to slidingly move the line supporting rails 96 or 101 of the existing lines A, B as required, mount the rail of the line to be substituted or added on the base member 91, and thereafter slidingly return the rails 96 or 101 of the existing lines A, B to the proper position. Thus, lines can be added or modified with greater ease.

Figure 17A:
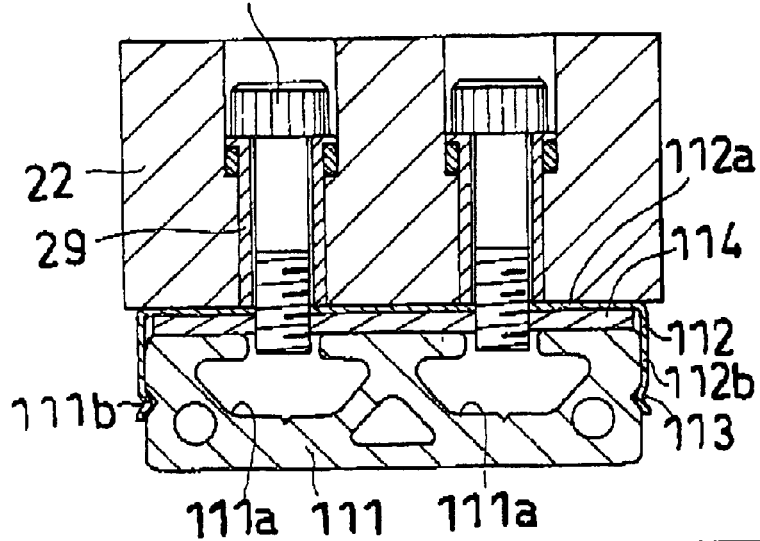
FIG. 17 includes a view in section showing a ninth embodiment of fluid control device of the invention.
Figure 17B:
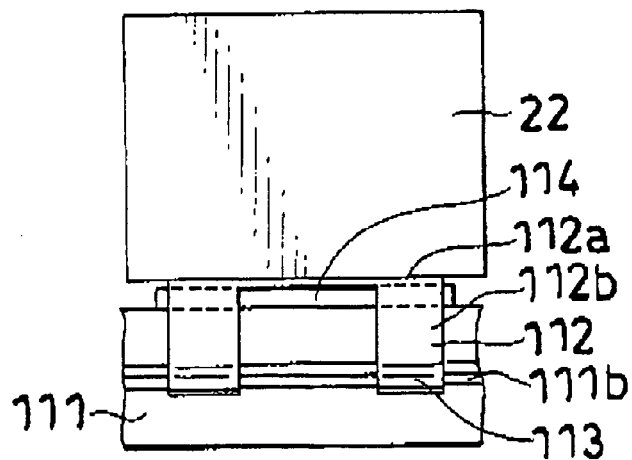

FIG. 17 shows a ninth embodiment. With reference to the drawing, a line supporting rail 111 is provided by a two-groove shaped member. The rail 111 has inside thereof two internally enlarged grooves 111a each opened upward and having a downwardly tapered trapezoidal cross section. The rail 111 further has a groove 111b formed in each of opposite outer side wells and extending longitudinally of the rail (front-rear direction). A slide member 112 is made of a metal and of the gripping type. Stated more specifically, the slide member 112 is inverted U-shaped and has a top wall 112a and front and rear vertical walls 112b. The slide member 112 is attached to the rail 111 by the opposite vertical walls 112b holding the outer side walls of the rail 111 therebetween. The vertical walls 112b of the slide member 112 are each cut out at an intermediate portion thereof and are thereby given increased elasticity in the left-right direction. Each wall 112b is inwardly bent at an intermediate portion of its height to thereby form an inward protrusion 113. The protrusions 113 of the vertical walls 112b of the slide member 112 are fitted in the grooves 111b in the outer side wells of the rail 111, whereby the slide member 112 is made movable only in the lengthwise direction. A plate spacer 114 is interposed between the upper surface of the rail 111 and the top well 112b of the slide member 112. Screws 26 extending through the coupling 22 further extend through the top wall 112b of the slide member 112 and have their lower ends screwed in internally threaded portions in the spacer 114, whereby the coupling 22 is joined to the slide member 112.

Figure 18A:
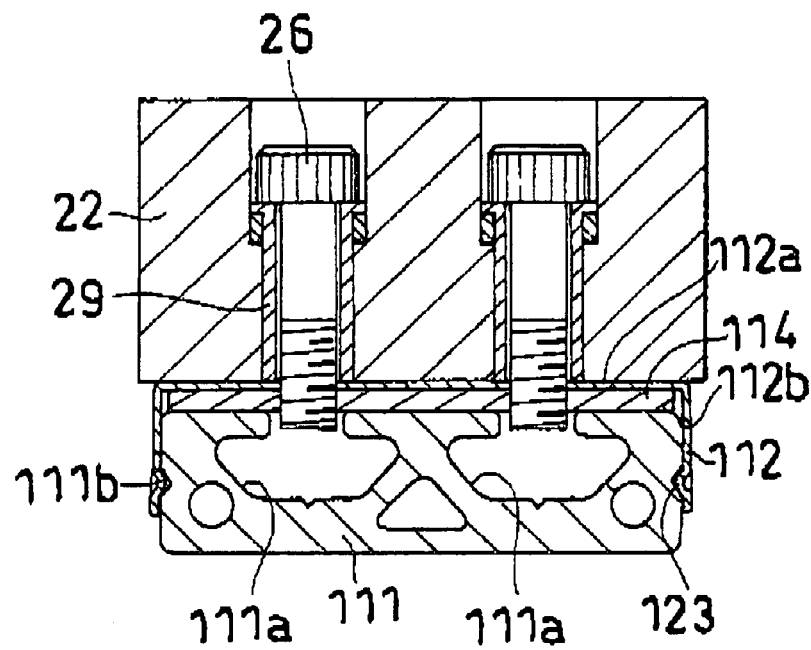
FIG. 18 includes a view in section showing a tenth embodiment of fluid control device of the invention.
Figure 18B:
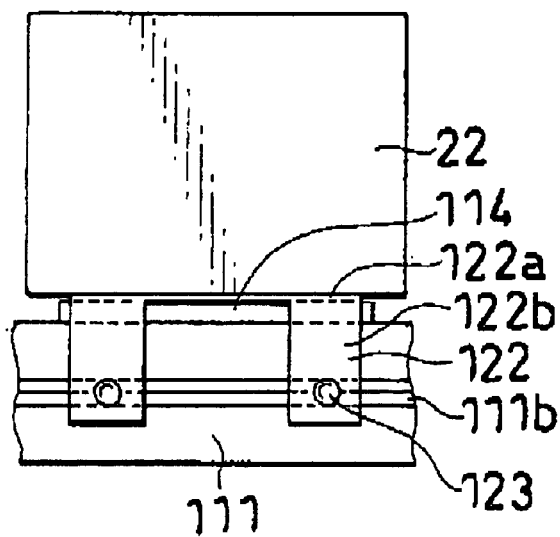

FIG. 18 shows a tenth embodiment. The drawing shows a line supporting rail 111 which has the same shape as that of the ninth embodiment. A slide member 122 is made of a metal and of the gripping type. The slide member 122 is inverted U-shaped and has a top well 122a and front end rear vertical walls 122b. Screws 26 extending through a coupling 22 further extend through the top wall 122b of the slide member 122 and have their lower ends screwed in screw holes form ed in a spacer 114, whereby the coupling 122 is coined to the slide member 122. With respect these features, the tenth embodiment is the same as the ninth. According to the present embodiment, the vertical walls 122b of the slide member 122 each have an inward protrusion 123 integrally formed at an intermediate portion of the height thereof. The protrusions 120 are fitted in grooves 111b in outer side walls of the rail 111, whereby the slide member 122 is made movable only in the longitudinal direction.

The slide member 112 or 122 of the ninth or tenth embodiment may of course be made of rubber or synthetic resin instead of metal. The rubber to be used is preferably nonadhesive so as to ensure slidability, while the metal slid member is more preferably coated with Teflon or the like and thereby given improved slidability.

Figure 19A:
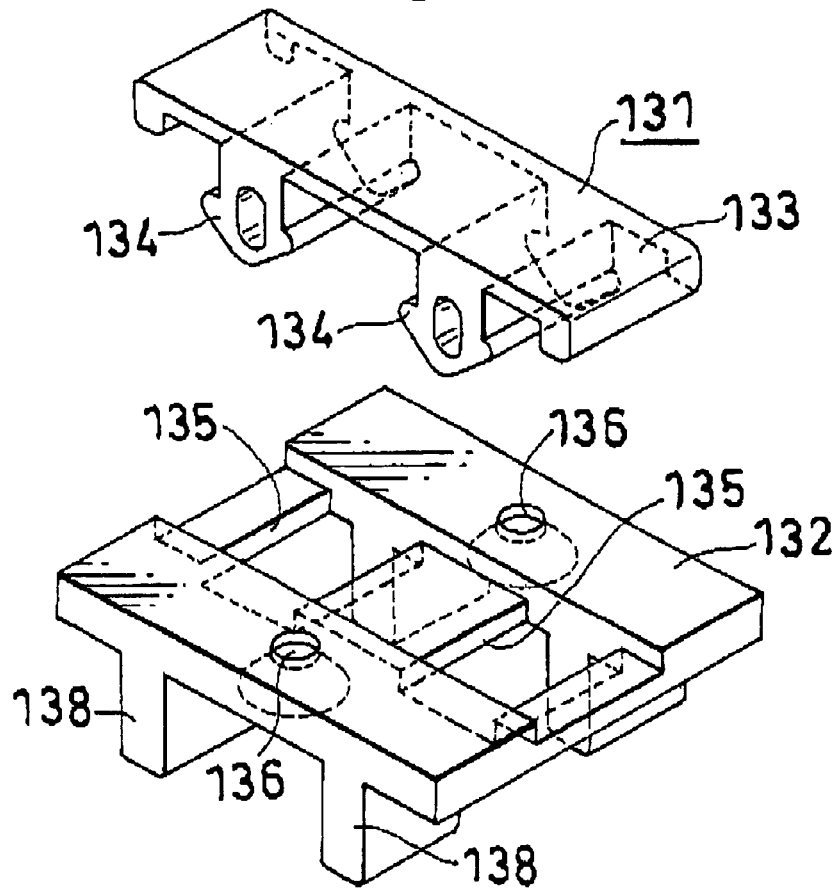
FIG. 19 includes an exploded perspective view and sectional views which shows an eleventh embodiment of fluid control device of the invention.
Figure 19B:
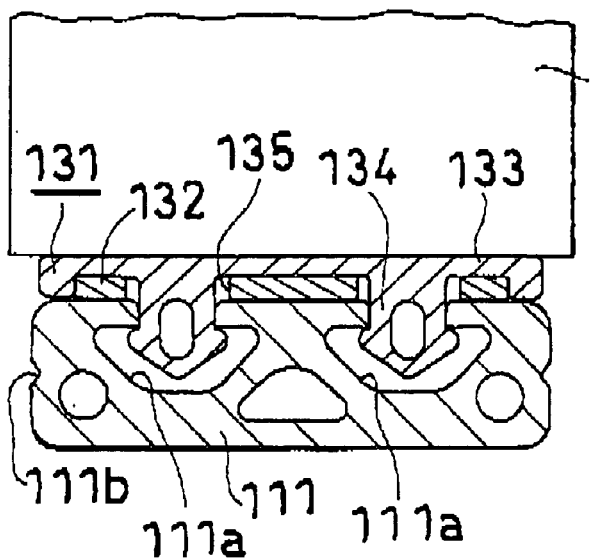
Figure 19C:
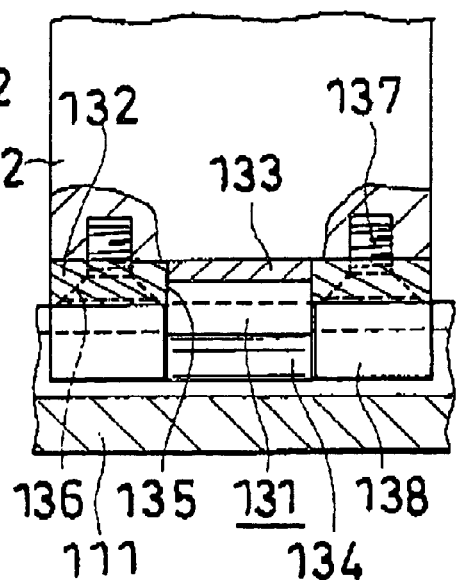

FIG. 19 shows an eleventh embodiment. With reference to the drawing, a line supporting rail 111 has the same shape as that of the ninth embodiment, while a slide member 131 is adapted to fit into the internally enlarged grooves 111a of the rail 111. More specifically, the slide member 131 is made of rubber and comprises a plate portion 133 in contact with the lower surface of a coupling 22, and downward projections 134 extending downward from the plate portion 133. Each downward projection 134 has a lower end fitted in the enlarged groove 111a so as not to slip out therefrom and is provided with a hollow portion so as to be easily deformable in the leftward or rightward direction. A plate spacer 132 is interposed between the upper surface of the rail 111 and the plate portion 133 of the slide member 131. The spacer 132 has a rectangular hole 135 for inserting the downward projections 134 of the slide member 112 therethrough from above, two circular holes 136 for inserting screws 137 therethrough from below, and downward projections 138 slidably fitted in the rail 111. The slide member 131 is connected to the coupling 22 by fixing the spacer 132 to the coupling 22 with the screws 137. The slide member 131 may of course be made from metal or synthetic resin instead of rubber.

In the fourth embodiment shown in FIG. 8, fifth embodiment shown in FIG. 9, ninth embodiment shown in FIG. 17, tenth embodiment shown in FIG. 18 and eleventh embodiment shown in FIG. 19, the slide member 63, 71, 112, 122 or 131 is not fixed with a screw, is therefore movable and is preferably used in combination with a slide member fixed to the rail with a screw (e.g. the member 102 of FIG. 15). In this case, the coupling 61, 61 or 22 having the movable slide member 53, 71, 112, 122 or 131 is connected to the coupling 22 having the fixed slide member 102 by the fluid controller and is thereby prevented from moving.

When lines are to be modified or added according to the seventh to eleventh embodiments, it is possible to slidingly move the line supporting rails 96 or 101 of the existing lines A, B as required, mount the rail of the line to be substituted or added on the base member 91, and thereafter slidingly return the rails 96 or 101 of the existing lines A, B to the proper position. Thus, lines can be added or modified with greater ease.

When lines are to be modified or added according to the seventh to eleventh embodiments even in the case where plate members having no track are used in place of the line supporting rails 96 or 101, it is possible to slidingly move the line supporting plate members of the existing lines as required, mount the plate member of the line to be substituted or added on the base member, and thereafter slidingly return the plate members of the existing lines to the proper position. Thus, these embodiments have the advantage that lines can be added or modified easily.

What is claimed is:

1. A fluid control device wherein a plurality of lines each comprise:
a plurality of fluid controllers arranged at an upper level,
a plurality of block coupling members arranged at a lower level,
a plurality of external member connecting couplings arranged at the lower level,
the plurality of lines being arranged in parallel on a base member having at least one orthogonal rail extending in a direction orthogonal to the plurality of lines, the plurality of lines having inlets directed in the same direction, with outlets thereof facing toward the same direction, wherein the inlets and outlets correspond to the external member connecting couplings,
the fluid control device being characterized in that the base member is provided with a plurality of tracks arranged in parallel and corresponding to the respective lines, wherein the plurality of tracks includes at least a first track,
the plurality of tracks being mounted on the at least one orthogonal rail, each track being slidable along the at least one orthogonal rail relative to other of said tracks in a direction orthogonal to the lines after the tracks are mounted on the at least one orthogonal rail,
the block coupling members and external member connecting couplings being slidably mounted directly on the corresponding track,
at least one of the fluid controllers being mounted on two of the block coupling members, at least one of the fluid controllers being mounted on one of the block coupling members and one of the external member connecting couplings, wherein
slide members corresponding to the respective block coupling members are provided on the track,
each of the slide members being connected to the corresponding block coupling member, each of the slide members including a first half segment and a second half segment, each of the half segments having an upper surface forming a stepped portion with a lower portion at an outer side,
two of the block coupling members are not directly connected to each other so that each block coupling member can be fixed at any position of the track independently, and
each block coupling member has vertical internally threaded portions formed in the upper wall, and each block coupling member has a V-shaped or U-shaped channel,
the at least one fluid controller mounted on two of the block coupling members is attached by driving screws inserted through the at least one fluid controller mounted on two of the block coupling members into the internally threaded portions of the block coupling members,
wherein each one of the tracks comprises two shape members each having a groove and being arranged side by side, each of the shape members forms the groove between two inward flanges, the groove has a downwardly tapered trapezoidal cross section, and a slide member having a downwardly tapered trapezoidal cross section and a vertical internally threaded portion is provided in the track and is connected to one of the coupling members by a screw member.

* * * * *